3,577,411
6-PHENYLBENZAZOLYL DERIVATIVES

Peter Liechti, Binningen, Leonardo Guglielmetti, Birsfelden, Erwin Maeder, Aesch, Basel-Land, and Adolf Emil Siegrist, Basel, Switzerland, assignors to Ciba Limited, Basel, Switzerland
No Drawing. Continuation-in-part of application Ser. No. 483,355, Aug. 27, 1965. This application Oct. 9, 1967, Ser. No. 673,953
Claims priority, application Switzerland, Sept. 4, 1964, 11,401
Int. Cl. C07d 85/48
U.S. Cl. 260—240    10 Claims

ABSTRACT OF THE DISCLOSURE

The present invention relates to new and valuable 6-phenyl-2-stilbenyl-benzoxazoles which may be represented by the formula

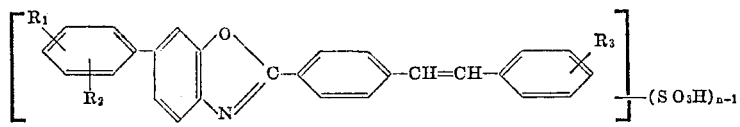

wherein $R_1$, $R_2$ and $R_3$ are identical or different and each represents a member selected from the group consisting of hydrogen, halogen, alkyl or alkoxy containing 1 to 12 carbon atoms, phenyl, phenylalkyl with 1 to 4 carbon atoms in the alkyl portion, nitrile, free or neutralized carboxyl (—COO cation), carboxylic acid alkyl ester with 1 to 12 carbon atoms in the alkyl portion, carbon amide, carbon alkyl amide with 1 to 12 carbon atoms, free or neutralized sulphonic acid (—SO₂O cation) or sulphonamide, and $n$ stands for the whole numbers 1 to 3.

The compounds of this invention are especially useful as optical brighteners for organic materials.

CROSS REFERENCE TO RELATED APPLICATIONS

This is a continuation-in-part application of our copending application Ser. No. 483,355, now abandoned, filed Aug. 27, 1965.

DESCRIPTION OF THE PREFERRED EMBODIMENTS

The present invention provides valuable new 6-phenyl-2-stilbenyl-benzoxazole optical brightening agents.

It is known in the art to use benzoxazole derivatives as optical brightening agents. However, up to the present, no definite predictions about the relationship between the specific structure and the fluorescence behavior of a given compound could be made. Now it has been discovered that both the type of substituents as well as the position of the substituents on the benzene ring of the benzoxazole has an unexpected influence on the optical brightening properties.

More specifically, it has been found that certain 6-phenylbenzoxazolyl compounds are especially useful as optical brighteners, and particularly those compounds which may be represented by the formula (1)

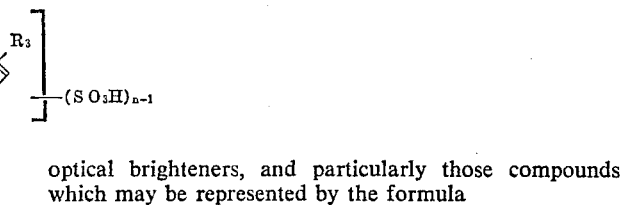

wherein $R_1$, $R_2$ and $R_3$ are identical or different and each represents a hydrogen atoms, a halogen atom, an alkyl or an alkoxy group containing 1 to 12 carbon atoms, a phenyl group, a phenylalkyl group with 1 to 4 carbon atoms in the alkyl portion, a nitrile group, a free or neutralized carboxyl group (—COO cation), a carboxylic acid alkyl ester group with 1 to 12 carbon atoms in the alkyl portion, a carbon amide group, a free or neutralized sulphonic acid group (—SO₂O cation) or a sulphonamide group, and $n$ stands for the whole numbers 1 to 3.

Among the new 6-phenylbenzoxazol compounds, particular attention is directed to the compounds which correspond to the formula (2)

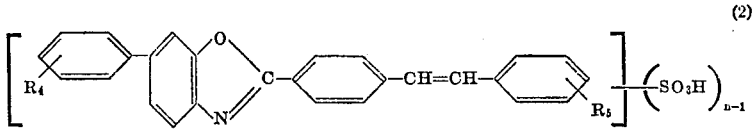

wherein $R_4$ represents a member selected from the group consisting of a hydrogen atoms, an alkyl group containing 1 to 6 carbon atoms and an alkoxy group containing 1 to 4 carbon atoms, $R_5$ represents a member selected from the group consisting of a hydrogen atoms, an alkyl group containing 1 to 6 carbon atoms, an alkoxy group containing 1 to 4 carbon atoms, a carboxylic acid group and a carboxylic acid alkyl ester group with up to 6 carbon atoms in the alkyl group, and $n$ represents a whole number from 1 to 3.

Especially valuable 6-phenylbenzoxazolyl compounds are those which correspond to one of the following formulae (3)
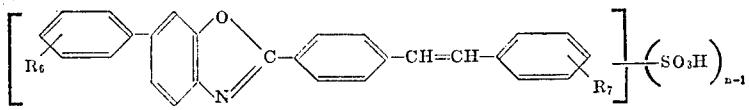

wherein $R_6$ represents a hydrogen atom or an alkyl group containing from 1 to 4 carbon atoms, $R_7$ represents a hydrogen atom, an alkyl group containing from 1 to 4 carbon atoms, an alkoxy group containing from 1 to 4 carbon atoms, a carboxylic acid group or a carboxylic acid alkyl ester group containing from 1 to 4 carbon atoms in the alkyl group, and $n$ stands for a whole number from 1 to 3;

(4)
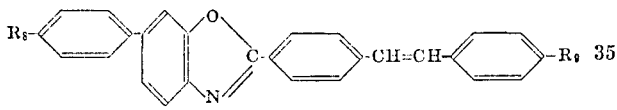

where $R_8$ represents a member selected from the group consisting of a hydrogen atom, an alkyl group with 1 to 6 carbon atoms and a phenyl group, and $R_9$ represents a member selected from the group consisting of a halogen atom, an alkyl group containing 1 to 4 carbon atoms, an alkoxy group containing 1 to 4 carbon atoms, a carboxylic acid group and a carboxylic acid—($C_1$ to $C_4$)—alkyl ester group;

(5)
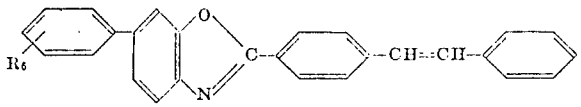

(6)
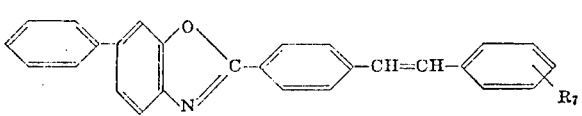

whereby in Formulae 5 and 6 the symbols $R_6$ and $R_7$ have the significance as given under Formula 3.

The new 6-phenylbenzazolyl compounds of the general Formula 1 can be manufactured by a variety of known methods.

According to one manufacturing process, for example, an ortho-amino compound of the formula (7)
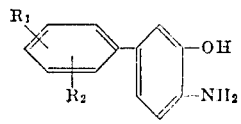

(where $R_1$ and $R_2$ have the above meanings) is reacted with a carboxylic acid or with a carboxylic acid halide of the formula (8)
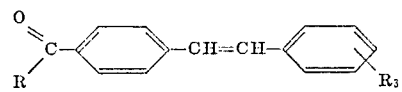

where R represents a hydroxyl group or a halogen atom, preferably chlorine, and $R_3$ has the above meaning, according to the following scheme of reactions:

(9)
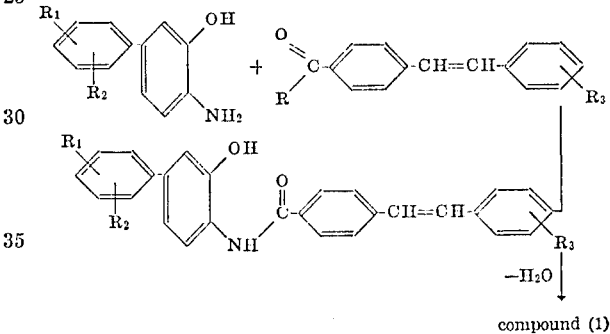

compound (1)

The reaction of the chosen components of the Formulae 7 and 8 can be carried out with or without intermediate isolation of the intermediately formed amides of the Formula 9 by heating at an elevated temperature, for example at 120 to 350° C., advantageously in an inert gas, for example under nitrogen, if desired or required in the presence of a catalyst. Suitable catalysts are, for example, boric acid, boric anhydride, zinc chloride, para-toluenesulphonic acid, also polyphosphoric acids including pyrophosphoric acid. When boric acid is used as catalyst, it is advantageously employed in an amount of 0.5 to 5% of the weight of the reaction mixture as a whole. Additionally, there may be used high-boiling, polar, organic solvents, for example dimethylformamide, dichlorobenzene, trichlorobenzene and aliphatic (if desired etherified) hydroxy compounds, for example propyleneglycol, ethyleneglycol monoethyl ether or diethyleneglycol diethyl ether and high-boiling esters of phthalic acid, for example dibutylphthalate.

It is of advantage to perform the process in two stages; in the first stage the carboxylic acid halide of the Formula 8 is condensed with the ortho-amino compound of the Formula 7 in the presence of an inert organic solvent, such as toluene, a xylene, chlorobenzene, dichlorobenzene, trichlorobenzene or nitrobenzene, at a temperature within the range from 100 to 200° C., and in the second stage the resulting acyl compound of the Formula 9 is converted into the 6-phenylbenzazolyl compound of the Formula 1 at a temperature from 150 to 350° C., optionally in the presence of a catalyst. When a carboxylic acid chloride is chosen as starting material, it can be prepared immediately before the condensation with the ortho-amino compound from the free carboxylic acid and thionylchloride, if desired or required in the presence of a catalyst such as pyridine, in the solvent in which subsequently the condensation is carried out.

As examples of new 6-phenylbenzazolyl compounds of the Formula 1 accessible by the process described there may be mentioned the following

(10)
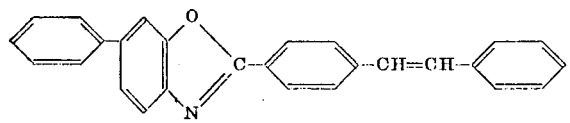

(11)
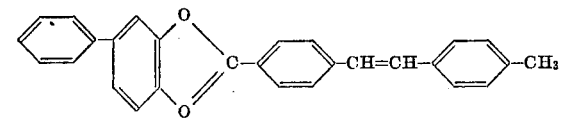

(12)
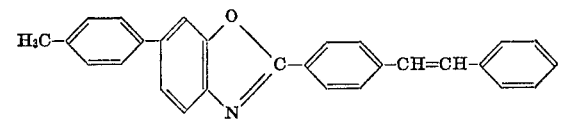

If desired, the azole derivatives of the Formula 1 obtained by the processes described above may be subjected to further reactions. Thus, for example, water-soluble derivatives are obtained when the azole derivative of the Formula 1 is sulphonated, e.g. with sulphuric acid monohydrate, chlorosulphonic acid or with sulphuric acid containing sulphur trioxide, if desired at an elevated temperature, and the sulphonic acid group is then converted with an organic or preferably an inorganic base into the corresponding salts.

The new optical brighteners of the composition defined above display in the dissolved or finely dispersed state a more or less pronounced fluorescence. They may be used for optically brightening a wide variety of organic materials of high or low molecular weight or materials containing organic substances.

As relevant examples the following groups of organic materials suitable for optical brightening may be mentioned, without thereby in any way restricting the possible scope:

Synthetic organic materials of high or low molecular weight:

(a) Polymers based on organic compounds containing at least one polymerizable carbon-to-carbon double bond, i.e. their homopolymers and copolymers and products obtained by after-treating them; such as cross-linked, grafted or decomposition products, polymer dilutions or the like; relevant examples are:

Polymers based on α,β-unsaturated carboxylic acids, especially of acryl compounds (e.g. acrylic esters, acrylic acids, acrylonitrile, acrylamides and their derivatives or their methacrylic analogues), of olefinic hydrocarbons (e.g. ethylene, propylene, isobutylene, styrenes, dienes, especially butadiene, isoprene i.e. also rubbers and rubber-like polymers; furthermore so-called ABS polymers), polymers based on vinyl and vinylidene compounds (e.g. vinyl esters, vinylchloride, vinylsulphonic acid, vinyl ethers, vinyl alcohol, vinylidenechloride, vinylcarbazole), of halogenated hydrocarbons (chloroprene, highly halogenated ethylenes), of unsaturated aldehydes and ketones (e.g. acrolein or the like), of allyl compounds or the like; graft polymerization products (e.g. by grafting vinylic monomers), cross-linked products (e.g. by means of bifunctional or polyfunctional cross-linking agents such as divinylbenzene); polyfunctional allyl compounds or bis-acryl compounds, or products accessible by partial decomposition (hydrolysis, depolymerization) or modification (e.g. esterification, etherification, halogenation, auto-cross-linking).

(b) Other polymers accessible, for example, by ring opening e.g. polyamides of the polycaprolactam type; furthermore formaldehyde polymers or polymers accessible by polyaddition as well as by polycondensation, such as polyethers, polythioethers, polyacetals and thioplasts;

(c) Polycondensation products or precondensates based on bifunctional or polyfunctional compounds containing condensable groups, their homo- and cocondensates and products obtained by after-treating them; relevant examples are:

Polyesters, saturated (e.g. polyethylene terephthalate) or unsaturated (e.g. maleic acid-dialcohol polycondensates) and their cross-linked products with polymerizable vinyl monomers, linear or branched (also those based on polyhydric alcohols e.g. alkyd resins);

Polyamides (e.g. hexamethylenediamine adipate) maleinate resins, melamine resins, phenolic resins (novolaks), aniline resins, furan resins, carbamide resins and their precondensates, and similarly constituted products, polycarbonates, silicone resins and other.

(d) Polyadducts such as polyurethanes (if desired cross-linked), epoxy resins.

(II) Semisynthetic organic materials e.g. cellulose esters or mixed esters (acetate, propionate, nitrocellulose, cellulose ethers, regenerated cellulose (viscose, cuprammonium cellulose) or products obtained by after-treating them, casein plastics.

(III) Natural organic materials of animal or vegetable origin, e.g. based on cellulose or proteins such as wool, cotton, silk, bast, jute, hemp; furs and hairs, leathers, finely dispersed wood masses, natural resins (such as colophonyl, especially lacquer resins); furthermore rubber, gutta percha, balata and products obtained by after-treating or modifying them (e.g. by curing, cross-linking or grafting), decomposition products (e.g. by hydrolysis, depolymerization), products accessible by conversion of reactive groups (e.g. by acylation, halogenation, cross-linking or the like).

The organic materials that can be optically brightened may be at any stage of their processing (raw materials, semi-finished products or finished articles) and physical states. They may be in the form of structures of any desired shape, that is to say, for example, they may be predominantly three-dimensional bodies such as blocks, plates, sections, pipes, injection mouldings or components of any desired kind, chips or granulates, foamed articles; predominantly two-dimensional bodies such as films, foils, lacquers, tapes, coatings, impregnations or coatings; or predominantly unidimensional bodies such as filaments, fibers, flocks, bristles or wires. The said materials may also be as yet not shaped and be in the most varied homogeneous and inhomogeneous forms of dispersion and physical states, for example in the form of powders, solutions, emulsions, dispersions, latices (e.g. lacquer solutions, polymer dispersions), sols, gels, putties, pastes, waxes, adhesives, pore fillers or the like.

Fibrous materials may, for example, take the form of monofils, staple fibres, flocks, hanks, textile threads, yarns, doubled yarns, fibre-fleeces, felts, cottonwool, flocculated products or of textile fabrics or textile laminates, knitwear, of papers, cardboards, paper pulps or the like.

The compounds to be used according to this invention are of special value for the treatment of textile organic materials, especially woven textile fabrics. If fibres—which may be staple fibres or monofils, in the form of nanks, woven or knitted fabrics, fleeces, flocculated substrates or laminates—are to be optically brightened by the present process, this is advantageously done in an aqueous medium in which the chosen compound is finely dispersed (suspended or, if desired, dissolved). If desired, there may be added to the treatment liquor a dispersant, for example soaps, polyglycol ethers of fatty alcohols, fatty amines or alkylphenols, cellulose sulphite waste liquor or condensation products of (possibly alkylated) naphthalenesulphonic acids with formaldehyde. It has been found particularly advantageous to work in a neutral, weakly alkaline or acid bath. Likewise, it is advantageous to perform the treatment at a temperature from about 50 to 100° C., for example at the boiling temperature of the bath or in its vicinity (at about 90° C.). The improving treatment according to this invention may also be carried out with solutions in organic solvents.

Furthermore, the new optical brighteners to be used in this invention may be added to, or incorporated with, the materials before or during their shaping. Thus, for example, in the manufacture of films, foils, tapes or mouldings they may be added to the moulding or injection moulding composition or they may be dissolved, dispersed or in any other way finely distributed in the spinning mass before spinning. The optical brighteners may also be added to the starting materials, reaction mixtures or intermediate products to produce fully synthetic or semi-synthetic organic materials, that is to say before or during the chemical reaction, e.g. a polycondensation (including the precondensates), a polymerization (including the prepolymers) or a polyaddition.

The new optical brighteners can, of course, also be used whenever organic materials of the kind indicated above are combined in any desired manner with inorganic materials in any desired form (typical examples: detergents, white pigments in organic substances).

The new optical brighteners are distinguished by their particularly good heat resistance and fastness to light and to migration.

The amount of the new optical brightener to be used according to this invention, referred to the weight of the material to be optically brightened, may vary within wide limtis. Even very small amounts, in some cases, for instance as little as 0.001% by weight, may suffice to produce a distinct and durable effect, though it is also possible to use amounts of up to about 0.5% by weight or more. For most practical purposes an amount ranging from 0.01 to 0.2% by weight will be preferred.

The new compounds, to be used as brightening agents, may also be applied, for example, as follows:

(a) In admixture with deystuffs or pigments or as additives to dyebaths, or printing, discharge or reserve pastes. Also for after-treating dyeings, prints or discharge prints.

(b) In admixture with so-called "carriers," antioxidants, light filters, heat stabilizers, chemical bleaches or as additives to bleaching baths.

(c) In admixture with cross-linking agents, dressings such as starch or synthetic dressings. It may be of advantage to add the product of this invention to the liquors used for producing an anti-crease finish.

(d) In combination with detergents. The detergent and the optical brightener may be added separately to the washing liquor. It is also advantageous to use detergents that as such already contain a share of brightening agent. Suitable detergents are e.g. soaps, salts of sulphonate washing agents e.g. of sulphonated benzimidazoles substituted on the carbon atom 2 by higher alkyl radicals, also salts of monocarboxylic acid esters of 4-sulphophthalic acid with higher fatty alcohols, also salts of fatty alcohol sulphonates, alkylarylsulphonic acids or condensation products of higher fatty acids with aliphatic hydroxysulphonic or aminosulphonic acids. Furthermore, there may be used non-ionic detergents e.g. polyglycol ethers derived from ethylene oxide and higher fatty alcohols, alkylphenols or fatty amines.

(e) In combination with polymeric vehicles (polymers, polycondensates or polyadducts) in which the brightening agent, if desired in addition to other substances, is incorporated in the dissolved or dispersed form, for example in the case of coating, impregnating or binding agents (solutions, dispersions, emulsions) for textile materials, fleeces, papers or leathers.

(f) As additives ot a wide variety of industrial products to improve their presentation or to obviate disadvantages in their use for example as additives to glues, adhesives, paints or the like.

The compounds of the above formulae can be used as scintillators, for various photographic purposes, such as for electrophotographic reproduction or for supersensitizing.

If the brightening operation is to be combined with other treating or improving operations, the combined treatment is advantageously performed with the use of a suitable stable preparation which contains in addition to optically brightening compounds of the above general formula also dispersants, detergents, carriers, dyestuffs, pigments or dressing agents.

When treating a number of fibrous substrates, e.g. polyester fibres, with the brighteners of this invention it is advantageous to impregnate these fibres with an aqueous dispersion of the brightener at a temperature below 75° C., e.g. at room temperature, and then to subject it to a dry heat treatment at a temperature above 100° C. In general, it is of advantage first to dry the impregnated material at a moderately raise termperature, e.g. at a temperature from at least 60° C. to about 100° C. The dry heat treatment is then advantageously carried out at 120° to 225° C., for example by heating in a drying chamber, by ironing within the indicated temperature range or by treatment with dry, superheated steam. If desired, the drying and the dry heat treatment may follow immediately upon each other or they may be performed in a single stage.

Unless otherwise indicated, parts and percentages in the following examples are by weight.

EXAMPLE 1

A mixture of 1.85 parts of 3-hydroxy-4-aminodiphenyl, 2.4 parts of stilbene-4-carboxylic acid chloride and 50 parts by volume of anhydrous trichlorobenzene is heated under nitrogen within one hour to 170° C., after which time the evolution of hydrogen chloride ceases. 0.1 part of boric acid is added and the batch is heated within a further hour to 220° C., with 40 parts by volume of solvent and the eliminated water distilling off. After cooling, suctioning, washing with carbon tetrachloride and drying, there are obtained 2.77 parts of the compound of the formula (10)

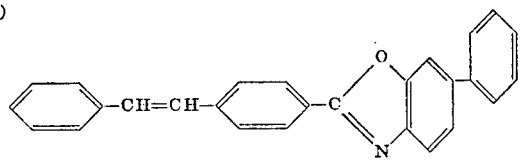

as greenish crystals from perchloroethylene, melting at 210° to 212° C.

$C_{27}H_{19}ON$ mol. weight: 373.43. Calculated (percent): C, 86.84; H, 5.13; N, 3.75. Found (percent): C, 86.89; H, 5.27; N, 3.89.

In an analogous manner the compounds of the following formulae are obtained:

(11)

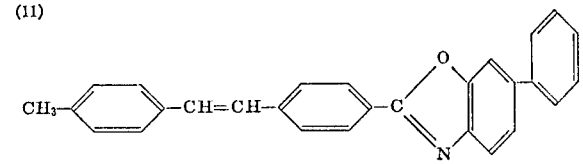

yellowish crystals from perchloroethylene, melting at 238° to 240° C.

$C_{28}H_{21}ON$ mol. weight: 387.46. Calculated (percent): C, 86.79; H, 5.46; N, 3.62. Found (percent): C, 86.71; H, 5.65; N, 3.40.

(13)

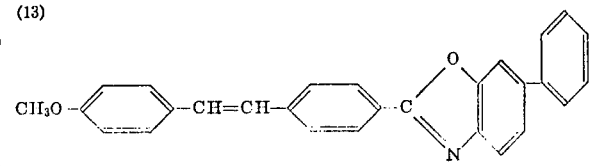

light-yellow crystals from ortho-dichlorobenzene, melting at 251° to 253° C.

$C_{28}H_{21}O_2N$ (mol. weight: 403.46). Calculated (percent): C, 83.35; H, 5.25; N, 3.47. Found (percent): C, 83.09; H, 5.48; N, 3.43.

(14)

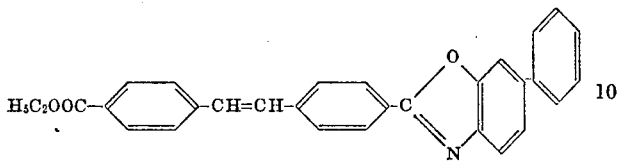

greenish yellow crystals from ortho-dichlorobenzene, melting at 213 to 215° C.

$C_{30}H_{23}O_3N$ (mol. weight: 445.49). Calculated (percent): C, 80.88; H, 5.20; N, 3.14. Found (percent): C, 80.94; H, 5.04; N, 3.34.

(15)

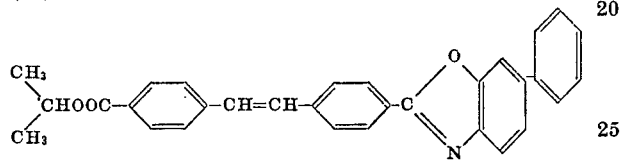

greenish yellow crystals from dimethylformamide, melting at 202 to 205° C.

$C_{31}H_{25}O_3N$ (mol. weight: 459.52). Calculated (percent): C, 81.02; H, 5.48; N, 3.05. Found (percent): C, 81.12; H, 5.38; N, 3.10.

EXAMPLE 2

When stilbene-4-carboxylic acid chloride is reacted as described in Example 1 with the under-mentioned substituted 3-hydroxy-4-aminodiphenyls, the oxazoles of the following formulae are obtained:

(12)

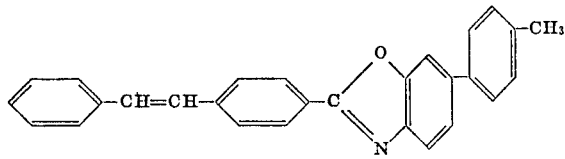

yellowish crystals from perchloroethylene, melting at 220 to 221° C.

$C_{28}H_{21}ON$ (mol. weight: 387.46). Calculated (percent): C, 86.79; H, 5.46; N, 3.62. Found (percent): C, 86.65; H, 5.46; N, 3.48.

(16)

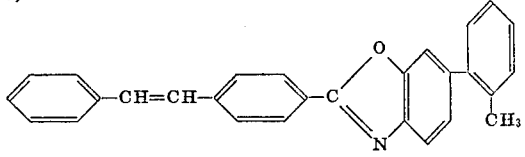

colourless crystals from perchloroethylene, melting at 139.5 to 141° C.

$C_{28}H_{21}ON$ (mol. weight: 387.46). Calculated (percent): C, 86.79; H, 5.46; N, 3.62. Found (percent): C, 86.39; H, 5.50; N, 3.54.

(17)

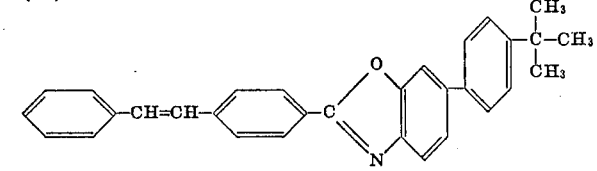

faintly greenish crystals from perchloroethylene, melting at 234 to 236° C.

$C_{31}H_{27}ON$ (mol. weight: 429.53). Calculated (percent): C, 86.68; H, 6.34; N, 3.26. Found (percent): C, 86.35; H, 6.40; N, 3.34.

The aminophenols used as starting materials are accessible from the corresponding nitro compounds by catalytic hydrogenation:

(18a)

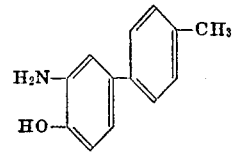

colourless crystals, melting at 205 to 206° C.

(18b)

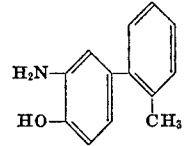

colourless crystals, melting at 193 to 195° C.

(18c)

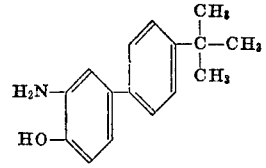

decomposing above 230° C.

EXAMPLE 3

4.6 grams of the compound of the formula (15)

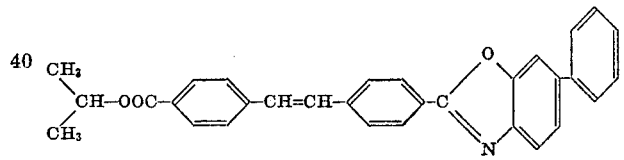

are stirred under reflux in 50 ml. of ethyleneglycol monomethyl ether; within 15 minutes 2.6 ml. of 5 N-sodium hydroxide solution are added and the whole is stirred on for one hour. The thick suspension is suctioned, washed with hot orthodichlorobenzene and then with carbon tetrachloride, and dried. Recrystallization from dimethylsulphoxide furnishes the sodium salt of the formula (19)

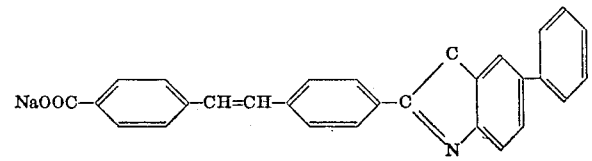

in the form of a white powder which decomposes above 370° C.

$C_{28}H_{18}O_3NNa$ (mol. weight: 439.45). Calculated (percent): C, 76.40; H, 4.12; N, 3.18. Found (percent): C, 76.17; H, 4.26; N, 3.27.

EXAMPLE 4

14.9 grams of the compound of the formula (10)

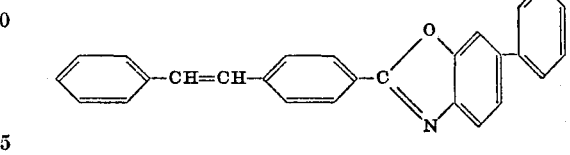

are stirred in 330 g. of sulphuric acid of 90% strength for 50 minutes at 100° C., then cooled, suctioned, and the yellow product is washed with concentrated sulphuric acid and dried under vacuum at 80° C., to yield 13 g. of the compound of the formula (20)

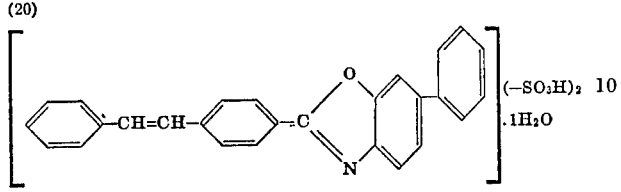

as a yellow powder which is readily soluble in water and in aqueous alkalies.

$C_{27}H_{21}O_8NS_2$ mol. weight: 551.58. Calculated (percent): C, 57.80; H, 3.83; N, 2.54; S, 11.65. Found (percent): C, 58.10; H, 4.10; N, 2.50; S, 12.20.

In identical manner and yield the compound of the formula (14)

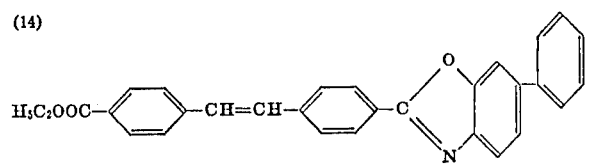

yields the sulphonic acid of the formula (21)

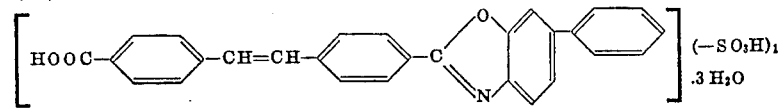

as a yellow powder which is soluble in aqueous alkalies.

$C_{28}H_{25}O_9NS$ (mol. weight: 551.56). Calculated (percent): C, 60.97 H, 4.58; N, 2.54; S, 5.80. Found (percent): C, 60.60; H, 4.50; N, 2.50; S, 6.40.

EXAMPLE 5

100 parts of polyester granulate from polyterephthalic acid ethyleneglycol ester are intimately mixed with 0.05 part of the compound of the Formulas 10, 15 or 14 and melted with stirring at 285° C. When this spinning mass is spun through the usual spinnerets, strongly brightened polyester fibres are obtained.

If desired, the above-mentioned benzoxazolyl compounds may be added to the starting materials alternatively before or during the polycondensation leading to the polyester.

EXAMPLE 6

10,000 parts of a polyamide in chip form, prepared in known manner from hexamethylenediamine adipate, are mixed in a tumbler for 12 hours with 30 parts of the compound of the formula (10)

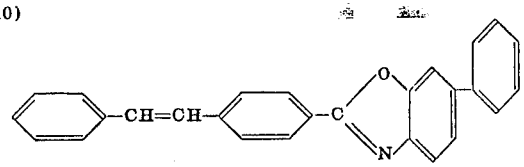

The chips so treated are melted in a boiler from which the atmospheric oxygen has been displaced with superheated steam and which is heated at 300 to 310° C. with oil or diphenyl vapour; the melt is stirred for half an hour, then expressed through a spinneret under a nitrogen pressure of 5 atmospheres (gauge) and the resulting, cooled filament is reeled on a cheese. The filament thus obtained displays an excellent brightening effect which is fast to heat-setting and has good fastness to washing and light.

EXAMPLE 7

10,000 parts of a polyamide in chip form, prepared in known manner from ε-caprolactam, are mixed in a tumbler for 12 hours wtih 30 parts titanium dioxide (rutile modification) and 2 parts of the compound of the formula (10)

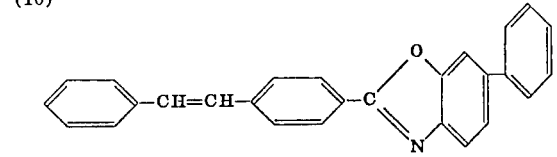

The chips treated in this manner are melted in a boiler, from which the atmospheric oxygen has been displaced and which is heated at 270° C., and stirred for half an hour. The melt is then expressed thorugh a spinneret under a nitrogen pressure of 5 atmospheres (gauge), and the cooled filament is reeled on a cheese. The filaments obtained in this manner display an excellent brightening effect which is stable to heat-setting and has good fastness to washing and light.

EXAMPLE 8

100 grams of polypropylene ("fibre grade") are intimately mixed with 0.02 g. of the compound of the formula (10)

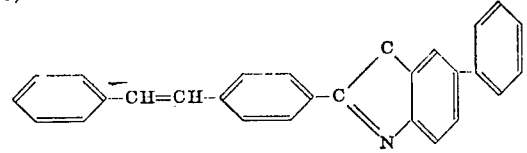

and melted at 280 to 290° with stirring. When the melt is spun through usual spinnerets and stretched, it furnishes polypropylene fibres that display an excellent brightening effect which is fast to light.

EXAMPLE 9

Polyester fibres (for example Terylene) are treated for 60 minutes at 60 to 100° C. at a goods-to-liquor ratio of 1:10 to 1:40 with 0.02% to 0.2% of the compound of the Formula 16 in a bath containing per litre 1 g. of an adduct from about 33 mols of ethylene oxide with 1 mol of octadecyl alcohol. The fibres are then rinsed and dried. The polyester fibres treated in this manner have a much higher white content than the untreated fibres had.

EXAMPLE 10

A polyester fabric (for example Dacron) is padded at room temperature with an aqueous dispersion containing per litre 2 g. of the compound of the Formula 10 or 17 and 1 g. of an adduct from about 8 mols of ethylene oxide with 1 mol of para-tertiary octylphenol, and then dried at about 100° C. The dry material is then subjected to a heat treatment at 150 to 220° C., lasting for 2 minutes to a few seconds depending on the temperature used. The material treated in this manner has a much better white aspect than the untreated material had.

EXAMPLE 11

Bleached polyamide fabric (nylon spun) is treated at a goods-to-liquor ratio of 1:30 for ½ hour at 40 to 90° C. in a bath containing 0.2% of the compound of the formula

(20) 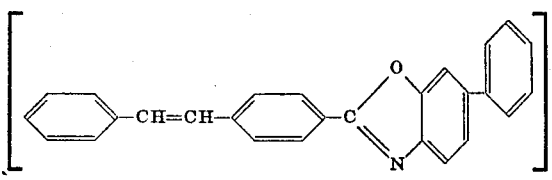

and 5% of concentrated formic acid (referred to the weight of the fibrous material). After having been rinsed and dried, the material treated in this manner has a higher white content than the untreated starting fabric. When formic acid is replaced by acetic acid, the resulting brightening effect is at least as good.

EXAMPLE 12

Cotton is washed at a goods-to-liquor ratio of 1:40 at 60 to 65° C. in a bath containing 10 g. of a washing agent of the following composition:

|  | Percent |
|---|---|
| Soap | 33.3 |
| Anhydrous sodium carbonate | 11.0 |
| Sodium pyrophosphate | 14.0 |
| Sodium perborate | 7.0 |
| Magnesium silicate | 3.0 |
| Compound of Formula 20 | 0.04 |
| Water | 31.66 |
|  | 100.00 |

(20) 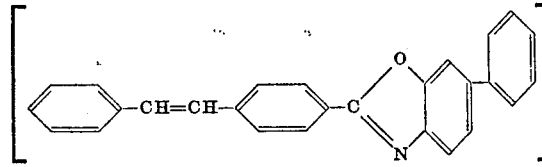

The cotton is then rinsed and dried. The cotton material treated in this manner displays an excellent white effect of good fastness to light, acids and chlorine. When during the washing operation a chlorine donor is additionally used, the brightening effect is in no way impaired. When the washing agent of the above composition is replaced by an anionic, non-ionic or cationic, liquid or solid synthetic wash-active compound, similar white effects are obtained.

If desired, the washing operation mentioned above can be carried out at the boil.

What is claimed is:
1. The 6-phenylbenzoxazole compound of the formula

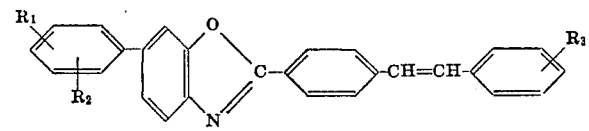

wherein $R_1$, $R_2$ and $R_3$ are identical or different and each represents a member selected from the group consisting of hydrogen, halogen, alkyl having 1–12 carbon atoms, alkoxy having 1–12 carbon atoms, phenyl, phenylalkyl having 1–4 carbon atoms in the alkyl portion, nitrile, carboxylic acid group and salts thereof, carboxylic acid alkyl ester with 1–12 carbon atoms in the alkyl portion, a carbon amide, carbon alkyl amide with 1–12 carbon atoms, sulphonic acid group and salts thereof, and sulphonamide, and at least one of $R_1$, $R_2$ and $R_3$ is other than hydrogen.

2. The 6-phenylbenzoxazolyl compound as claimed in claim 1 which corresponds to the formula

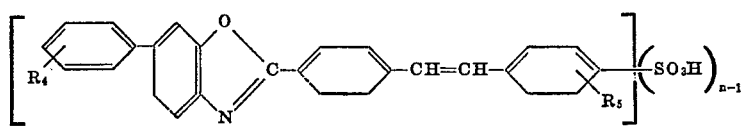

wherein $R_4$ represents a member selected from the group consisting of hydrogen, alkyl containing 1 to 6 carbon atoms and alkoxy containing 1 to 4 carbon atoms, $R_5$ represents a member selected from the group consisting of hydrogen, alkyl containing 1 to 6 carbon atoms, alkoxy containing 1 to 4 carbon atoms, carboxylic acid and carboxylic acid alkyl ester with 1 to 6 carbon atoms in the alkyl group, $n$ represents a whole number from 1 to 3, and at least one of $R_4$ and $R_5$ is other than hydrogen.

3. The 6-phenylbenzoxazolyl compound as claimed in claim 1 which corresponds to the formula

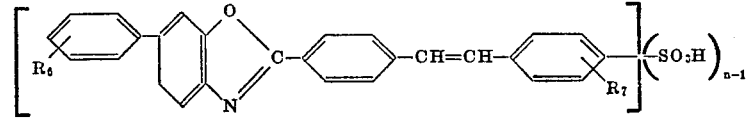

wherein $R_6$ represents a member selected from the group consisting of hydrogen and alkyl containing from 1 to 4 carbon atoms, $R_7$ represents a member selected from the group consisting of hydrogen, alkyl containing from 1 to 4 carbon atoms, alkoxy containing from 1 to 4 carbon atoms, carboxylic acid and carboxylic acid alkyl ester containing from 1 to 4 carbon atoms in the alkyl group, and $n$ stands for a whole number from 1 to 3, and at least one of $R_6$ and $R_7$ is other than hydrogen.

4. The 6-phenylbenzoxazolyl compound as claimed in claim 1 which corresponds to the formula

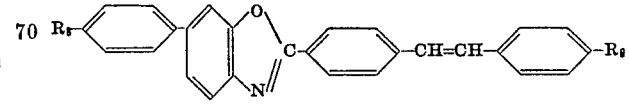

where $R_8$ represents a member selected from the group consisting of hydrogen, alkyl with 1 to 6 carbon atoms and phenyl, and $R_9$ represents a member selected from the group consisting of halogen, alkyl containing 1 to 4 carbon atoms, alkoxy containing 1 to 4 carbon atoms, carboxylic acid and a carboxylic acid alkyl ester having 1 to 4 carbon atoms in the alkyl group.

5. The 6-phenylbenzoxazolyl compound as claimed in claim 1 which corresponds to the formula

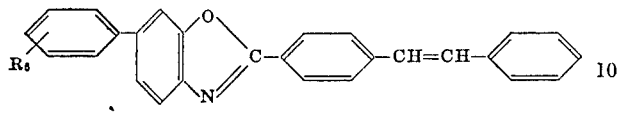

wherein $R_6$ represents an alkyl containing from 1 to 4 carbon atoms.

6. The 6-phenylbenzoxazolyl compound as claimed in claim 1 which corresponds to the formula

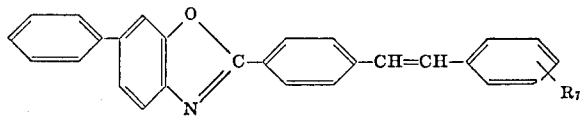

wherein $R_7$ represents a member selected from the group consisting of alkyl containing from 1 to 4 carbon atoms, alkoxy containing from 1 to 4 carbon atoms, carboxylic acid and carboxylic acid alkyl ester containing from 1 to 4 carbon atoms in the alkyl group.

7. The compound according to claim 1 of the formula

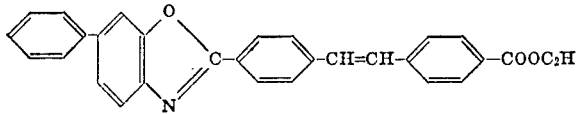

8. The compound according to claim 1 of the formula

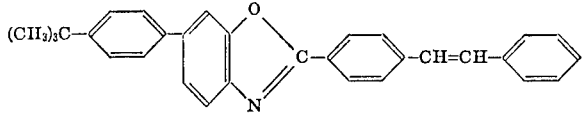

9. The compound according to claim 1 of the formula

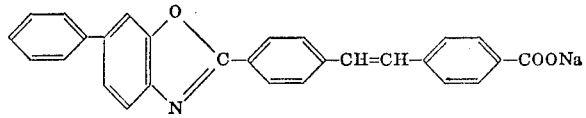

10. The compound according to claim 1 of the formula

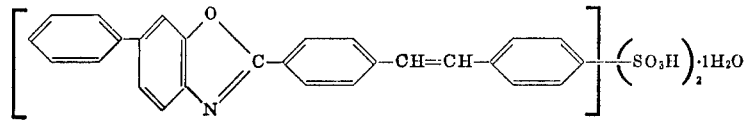

References Cited

UNITED STATES PATENTS 3,133,916  5/1964  Duennenberger et al. -- 260—240

FOREIGN PATENTS 1,378,454  10/1964  France _____ 260—240

JOHN D. RANDOLPH, Primary Examiner

U.S. Cl. X.R.

8—65, 116.2; 96—1, 1.6; 117—33.5; 162—162; 252—102, 110, 301.2; 260—37, 465, 469, 470, 471, 475, 507, 508, 516, 518, 519, 544